S. W. MARTIN.
BOILER-TUBE.
No. 169,913. Patented Nov. 16, 1875.
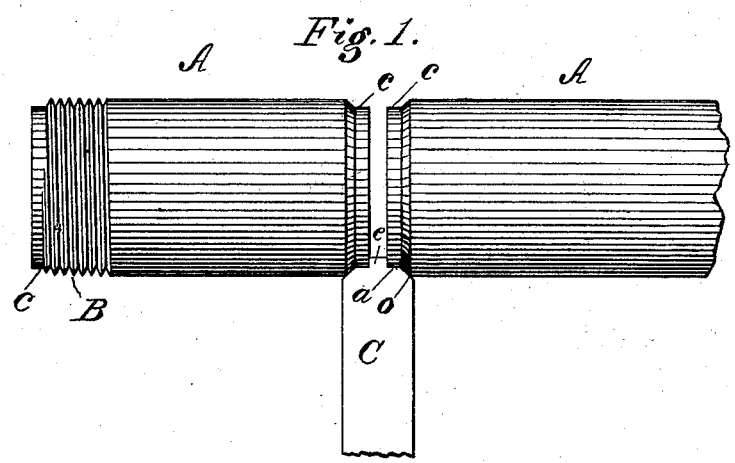
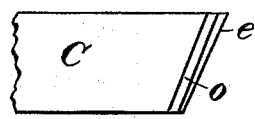
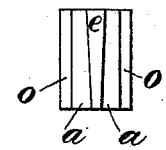
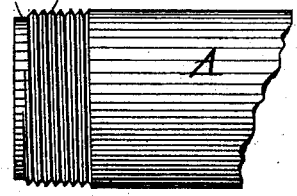
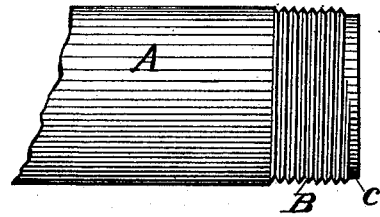
Witnesses:
Donn Twitchell
Will H. Dodge
Inventor:
Sam'l W. Martin,
by his Atty
Dodge & Son.

UNITED STATES PATENT OFFICE.

SAMUEL W. MARTIN, OF SPRINGFIELD, OHIO, ASSIGNOR TO P. P. MAST, OF SAME PLACE.

IMPROVEMENT IN BOILER-TUBES.

Specification forming part of Letters Patent No. 169,913, dated November 16, 1875; application filed August 19, 1875.

*To all whom it may concern:*

Be it known that I, SAMUEL W. MARTIN, of Springfield, in the county of Clarke and State of Ohio, have invented certain Improvements in Preparing Tubes for Boilers, and Tool for the same, of which the following is a specification:

My invention consists of a tube for boilers and similar articles, provided with a right and a left hand screw-thread at its opposite ends, and having at its extreme ends a smooth portion reduced in diameter equal to the depth of the thread, to serve as a means of holding the tubes in place and guiding them when screwed into the cast-iron heads or end pieces. It also further consists in a tool of novel construction, whereby these necks or journals are formed in the act of cutting off the pipes, as hereinafter more fully described.

Figure 1 is a plan view, showing the pipe as prepared, and the manner of using the tool in preparing the same. Fig. 2 is a side elevation, and Fig. 3 an end elevation of the tool. Fig. 4 represents the tube complete, ready for use, it being broken in order to reduce the length, so that both ends may be shown.

This invention has more especial reference to the preparation of tubes for the formation of steam-boilers, in which a series of tubes are connected to cast-iron heads or manifolds, though it is also applicable in the construction of radiators or any similar article in which a series of tubes are secured by screw-threads cut on their opposite ends to the end pieces or to caps and bases.

In constructing steam-boilers it is now customary to use a series of wrought-iron tubes of uniform lengths, and, after cutting a right-hand screw-thread on one end, and a left-hand thread on the opposite end, screw a series of these tubes into cast-iron heads at each end. As all of the series of tubes have to be entered and screwed up simultaneously it becomes a difficult operation, and it is to obviate this difficulty that my invention is designed.

In preparing tubes according to my plan I make on each end a small neck, *c*, as shown in Fig. 1, where A represents the pipe. After the pipes are thus prepared a screw-thread is cut on each end, as shown at B, Fig. 4, when they are ready for use. In order to form these necks *c* on the pipes with uniformity, and to cut the tubes into the required lengths at the same time, I construct a cutting-tool, C, as represented in the several figures.

This tool is made to be used like any cutting-tool in an ordinary metal-working lathe, and, as shown in Fig. 1, it is provided with a central-projecting lip, *e*, on each side of which is a lateral cutting-lip, *a*, and outside of these there is an inclined cutting-lip, *o*.

With such a tool it will be seen that by rotating the pipe in a lathe, and feeding the tool C up against it, the lip *e* will first commence to cut a narrow channel in the pipe, and, as it is fed up, the lips *a* will cut away the metal on opposite sides of the channel cut by the lip *e*, thus forming the necks *c*, the shoulders of which will be cut beveled or inclined by the inclined lips *o*, as represented in Fig. 1.

It will thus be seen that by these means the necks *c* on the pipes A will be formed in the act of cutting off the pipe, which has to be done in any event, and that, by this method, the subsequent operation of forming the necks separately is avoided. By varying the inclination of the lips *o* any desired bevel may be given to the shoulders of the necks *c*.

The prime object of forming the necks *c* on the pipes is to enable the pipes to be more readily entered and screwed into the holes in the heads or manifolds, as these parts are termed.

It is obvious that the necks may be cut on the pipes by means of an ordinary tool, but not so readily, and in that case it would require an additional operation.

Having thus described my invention, what I claim, is—

1. A tube for boilers and similar articles, having a right-hand screw-thread cut on one end, with a left-hand screw-thread on its opposite end, and a shoulder, *c*, formed on each end, as herein set forth.

2. The tool B, provided with the cutting-off lip *e*, and the neck-forming lips *a* and *o*, substantially as and for the purpose set forth.

SAMUEL W. MARTIN.

Witnesses:
ROBT. C. RODGERS,
A. T. BYERN.